(12) United States Patent
Gong et al.

(10) Patent No.: US 11,465,848 B2
(45) Date of Patent: Oct. 11, 2022

(54) METHOD AND APPARATUS FOR PROCESSING INFORMATION OF GOODS-PICKING CONTAINER, AND STORE SYSTEM

(71) Applicant: ALIBABA GROUP HOLDING LIMITED, Grand Cayman (KY)

(72) Inventors: Ye Gong, Hangzhou (CN); Hongbing Tang, Hangzhou (CN); Jianfei Fang, Hangzhou (CN); Can Zeng, Hangzhou (CN)

(73) Assignee: ALIBABA GROUP HOLDING LIMITED, George Town (KY)

( * ) Notice: Subject to any disclaimer, the term of this patent is extended or adjusted under 35 U.S.C. 154(b) by 60 days.

(21) Appl. No.: 17/087,405

(22) Filed: Nov. 2, 2020

(65) Prior Publication Data

US 2021/0047120 A1  Feb. 18, 2021

Related U.S. Application Data

(63) Continuation of application No. PCT/CN2019/084200, filed on Apr. 25, 2019.

(30) Foreign Application Priority Data

May 3, 2018 (CN) .......................... 201810414794.4

(51) Int. Cl.
 *B65G 1/137* (2006.01)
(52) U.S. Cl.
 CPC .... *B65G 1/1376* (2013.01); *B65G 2203/0216* (2013.01)
(58) Field of Classification Search
 CPC combination set(s) only.
 See application file for complete search history.

(56) References Cited

U.S. PATENT DOCUMENTS 4,927,205 A * 5/1990 Bowler ............... B65G 47/846
                                             118/503
7,246,706 B1 * 7/2007 Shakes ................ G06Q 50/28
                                             209/614

(Continued)

FOREIGN PATENT DOCUMENTS

CN       203938128 U    11/2014
CN       107025533 A     8/2017

(Continued)

OTHER PUBLICATIONS

Written Opinion of the International Searching Authority and International Search Report for PCT Application No. PCT/CN2019/084200 dated Jul. 24, 2019.

*Primary Examiner* — Kyle O Logan

(57) ABSTRACT

Embodiments of this application disclose methods and apparatuses for processing information for a goods-picking container, and a store system including a first area for storing goods and performing a plurality of goods-picking tasks, wherein each of the plurality of goods-picking tasks corresponds to one of one or more delivery batches and is performed with one of a plurality of goods-picking containers; an automatic transfer device configured to automatically transfer each of the plurality of goods-picking containers containing goods picked according to a corresponding goods-picking task in the first area to the second area; the second area for grouping the plurality of goods-picking containers into one or more groups, and for transferring the group of goods-picking containers to a third area; and the third area for packing the goods contained in the plurality of goods-picking containers according to each of the plurality of delivery batches.

18 Claims, 4 Drawing Sheets

(56) References Cited

U.S. PATENT DOCUMENTS

| | | | |
|---|---|---|---|
| 7,853,480 B2 | 12/2010 | Taylor et al. | |
| 7,970,905 B2 | 6/2011 | Baskaran et al. | |
| 8,234,006 B1 | 7/2012 | Sachar et al. | |
| 8,306,650 B1 | 11/2012 | Antony et al. | |
| 8,504,413 B1 | 8/2013 | Rowe et al. | |
| 8,577,740 B1 | 11/2013 | Murray et al. | |
| 8,594,834 B1* | 11/2013 | Clark | G06Q 10/087 |
| | | | 700/214 |
| 8,798,784 B1* | 8/2014 | Clark | G06Q 10/08 |
| | | | 700/214 |
| 9,171,278 B1 | 10/2015 | Kong et al. | |
| 9,189,768 B2 | 11/2015 | Plaster et al. | |
| 9,202,197 B1 | 12/2015 | Ramey et al. | |
| 9,280,756 B2 | 3/2016 | Hara et al. | |
| 9,477,888 B1 | 10/2016 | Lewis | |
| 9,626,712 B1 | 4/2017 | Shakes et al. | |
| 9,663,293 B2 | 5/2017 | Wurman et al. | |
| 9,731,856 B1 | 8/2017 | Houlihan et al. | |
| 9,811,784 B2 | 11/2017 | Wan et al. | |
| 2002/0178074 A1 | 11/2002 | Bloom | |
| 2007/0150383 A1* | 6/2007 | Shakes | G06Q 10/0875 |
| | | | 705/29 |
| 2009/0000912 A1* | 1/2009 | Battles | B65G 1/1371 |
| | | | 700/215 |
| 2018/0244473 A1* | 8/2018 | Mathi | B65G 47/905 |
| 2020/0385211 A1* | 12/2020 | Yamashita | B65G 1/1378 |
| 2021/0047120 A1* | 2/2021 | Gong | G06K 17/00 |

FOREIGN PATENT DOCUMENTS

| | | |
|---|---|---|
| CN | 107583882 A | 1/2018 |
| CN | 107597607 A | 1/2018 |

\* cited by examiner

METHOD AND APPARATUS FOR PROCESSING INFORMATION OF GOODS-PICKING CONTAINER, AND STORE SYSTEM

CROSS-REFERENCE TO RELATED APPLICATION

This application is a continuation application of International Application No. PCT/CN2019/084200, filed on Apr. 25, 2019, which is based on and claims priority to and benefit of Chinese Patent Application No. 201810414794.4, filed with the China National Intellectual Property Administration on May 3, 2018, entitled "Methods and Apparatuses for Processing Information of Goods-picking Container, and Store System." The entire contents of the above-identified applications are incorporated herein by reference in their entirety.

TECHNICAL FIELD

This application relates to the field of information processing and, more specifically, to methods and apparatus for processing information of goods-picking containers, and a store system.

BACKGROUND

O2O (Online to Offline) systems combine offline business opportunities with the Internet, making the Internet a platform for offline transactions. Upgrading of the service e-commerce model has improved and perfected flows of the previous simple e-commerce modules, including goods (service) management, order placement, and payment, and thus expanded its reach into more frequent daily-life transactions. The new model caters to the needs of the traditional service industry that has long suffered from low efficiency and inadequate labor force absorption and has brought about an O2O boom symbolized by the emergence of a wide variety of O2O businesses such as food delivery, fresh delivery, on-site makeup, etc.

In this model, offline physical stores delivering groceries and fresh goods are usually called "supermarkets." In practice, in such a supermarket, there may be a number of departments in the categories of, for example, fruits, seafood, and so on. Each department may purchase goods in advance and store them on shelves in bulks or otherwise. For example, when receiving an online order for a specified number of kilograms of apples from a consumer, as a normal operation in the supermarket, the required amount of apples is weighed and then subjected to packaging and any other necessary processes. However, in practice, a single order often consists of items of different categories, so when there are many concurrent orders, measures would be taken to save delivery resources, such as collectively delivering multiple orders in a single batch. In such cases, one delivery batch may contain multiple items of goods, which when from different departments, would require goods-picking by different goods-picking persons in these departments. This can be accomplished by breaking down the delivery batch into multiple goods-picking tasks allocated for the departments and then grouping the goods resulting from the goods-picking tasks from the departments back into the original delivery batch to enable the subsequent packing and delivery operations. However, the batch breakdown and grouping are labor-intensive operations tending to affect delivery timeliness.

Therefore, there remain challenges for those skilled in the art with regards to how to improve the efficiency of offline operations and enhance delivery timeliness.

SUMMARY OF THE INVENTION

The specification provides methods and apparatus for processing information of goods-picking containers and a store system, which provides improved efficiency of offline operations and enhanced delivery timeliness.

The specification provides technical solutions as follows.

A store system, comprises: a first area for storing goods and performing a plurality of goods-picking tasks, wherein each of the plurality of goods-picking tasks corresponds to one of one or more delivery batches and is performed with one of a plurality of goods-picking containers, and each of the one or more delivery batches comprises one or more goods-picking tasks; an automatic transfer device arranged between the first area and a second area, and configured to automatically transfer each of the plurality of goods-picking containers containing goods picked according to a corresponding goods-picking task in the first area to the second area; the second area for grouping the plurality of goods-picking containers into one or more groups corresponding to the one or more delivery batches, and for transferring the group of goods-picking containers corresponding to each delivery batch to a third area; and the third area for packing the goods contained in the plurality of goods-picking containers according to each of the plurality of delivery batches.

A method for processing information for a goods-picking container, comprises: scanning, by a first terminal device, a graphical code on a goods-picking container that has been transferred from a first area of a store to a second area of the store by an automatic transfer device arranged between the first area and the second area, wherein the scanned graphical code comprises an identifier of the goods-picking container; submitting, by the first terminal device, the identifier of the goods-picking container to a first server; determining, by the first server, a corresponding goods-picking task based on the identifier of the goods-picking container, and a delivery batch to which the corresponding goods-picking task belongs, wherein the delivery batch comprises a plurality of goods-picking tasks respectively corresponding to a plurality of goods-picking containers; generating, by the first server, notification information based on allocation information of the delivery batch in a third area; and displaying, by the first terminal device, the notification information, based on which the goods-picking container is allocated to the third area.

A method for processing information for a goods-picking container, comprises: obtaining in advance a correlation of an identifier of the goods-picking container with an identifier of a delivery batch and an identifier of a goods-picking task, wherein the goods-picking container has been transferred from a first area of a store to a second area of the store by an automatic transfer device arranged between the first and second areas; based on an identifier of the goods-picking container submitted by a first terminal device in the second area, determining the identifier of the goods-picking task corresponding to the goods-picking container and information of the delivery batch to which the task belongs; and generating notification information based on the delivery batch and sending the notification information back to the first terminal device.

An apparatus for processing information for a goods-picking container, comprises: a scanning unit configured to scan a graphical code on the goods-picking container that has been transferred from a first area of a store to a second area of the store by an automatic transfer device arranged between the first area and the second area; a scanning result submission unit configured to obtain a scanning result and submit the scanning result to a first server, the scanning result including information about an identifier of the goods-picking container, the first server being configured to determine a delivery batch and a goods-picking task based on the identifier of the good-picking container and generate notification information based on information about the delivery batch; and a notification information displaying unit configured to display notification information based on which goods-picking container is transferred to a third area.

An apparatus for processing information for a goods-picking container, comprises: a correlation acquisition unit configured to obtain in advance a correlation of an identifier of the goods-picking container with an identifier of a delivery batch and an identifier of a goods-picking task, wherein the goods-picking container has been transferred from a first area of a store to a second area of the store by an automatic transfer device arranged between the first area and the second area; a delivery batch information determination unit configured to determine, based on an identifier of the goods-picking container submitted by a first terminal device in the second area, the identifier of the goods-picking task corresponding to the goods-picking container and information of the delivery batch to which the task belongs; and a notification information generation unit configured to generate notification information based on the delivery batch and send the notification information back to the first terminal device.

A computer system, comprises one or more processors; and a memory associated with the one or more processor, the memory being configured to store program instructions configured to perform following operations when read and executed by the one or more processor: obtaining in advance a correlation of an identifier of the goods-picking container with an identifier of a delivery batch and an identifier of a goods-picking task, wherein the goods-picking container has been transferred from a first area of a store to a second area of the store by an automatic transfer device arranged between the first area and the second area; based on information about an identifier of the goods-picking container submitted by a first terminal device in the second area, determining the identifier of the goods-picking task corresponding to the goods-picking container and information of the delivery batch to which the task belongs; and generating notification information based on the delivery batch and sending the notification information back to the first terminal device.

According to specific embodiments provided in the specification, the following benefits are offered: according to an embodiment of this application, the space in a store may be divided into first, second, and third areas, and according to delivery batches and goods-picking tasks generated from incoming orders, goods can be picked up and placed into goods-picking containers in the first area. The goods-picking containers containing the goods resulting from the tasks are then transferred by the automatic transfer device arranged between the first and second areas to the second area, where they are grouped and further transferred to the third area according to the corresponding delivery batches. After being packed in the delivery batches in the third area according to each of the delivery batches, the goods are prepared for delivery. In this way, the conventional layout of the first area as a front portion of the store is allowed to be unchanged. For example, as conventionally practiced, the first area can be divided, according to types of goods stored therein, into a plurality of sub-areas each configured to fulfill one or some goods-picking tasks for each delivery batch. For this reason, goods-picking operations can be simplified in each sub-area and performed in parallel across individual sub-areas. In addition, the use of the automatic transfer device can lead to savings in labor and time for transporting picked goods from the front portion to a back portion of the store. Further, the second area allows goods-picking containers to be grouped according to delivery batches before they are sent to the third area for packing. This enables packing operations in the third area to be performed in individual delivery batches, resulting in a further improvement in processing efficiency.

Furthermore, in optional embodiments, a warehouse control system and associated terminal devices may be provided, which can improve operating efficiency in the goods-grouping area. A product embodying this application does not necessarily have all the above-described advantages.

BRIEF DESCRIPTION OF THE DRAWINGS

In some embodiments, the accompanying drawings, to which reference is to be made in connection with the following description of embodiments, will be briefed below. Apparently, these drawings show only some embodiments of this application, and those of ordinary skill in the art can obtain other drawings in light of those contained herein, without paying any creative effort.

DETAILED DESCRIPTION

Embodiments of this application will be described below in a clear and thorough manner with reference to the accompanying drawings. Apparently, the embodiments described herein are only some, but not all, embodiments of the application. Any and all other embodiments obtained by those of ordinary skill in the art based on the disclosed embodiments are intended to be also embraced in the scope of this application.

Embodiment 1

In this embodiment according to the specification, a store system is provided, which comprises: a first area for storing goods and performing a plurality of goods-picking tasks, wherein each of the plurality of goods-picking tasks corresponds to one of one or more delivery batches and is performed with one of a plurality of goods-picking containers, and each of the one or more delivery batches comprises one or more goods-picking tasks; and an automatic transfer device arranged between the first area and a second area, and configured to automatically transfer each of the plurality of goods-picking containers containing goods picked according to a corresponding goods-picking task in the first area to the second area; the second area for grouping the plurality of goods-picking containers into one or more groups corresponding to the one or more delivery batches, and for transferring the group of goods-picking containers corresponding to each delivery batch to a third area; and the third area for packing the goods contained in the plurality of goods-picking containers according to each of the plurality of delivery batches.

In some embodiments, the first area, also called a "goods-picking area", may be configured to store goods and provide a workplace for goods-picking personnel to pick goods. In some embodiments, orders received from customers (e.g., received from online portals) may be grouped into delivery batches; and each of the delivery batches may generate a plurality of goods-picking tasks based on correlations between types of the data objects in the delivery batch and the goods stored/arranged in the first area. The plurality of goods-picking tasks may be allocated and fulfilled in the first area. The picked goods according to the goods-picking tasks may then be transferred to the second area (also called a "goods-grouping area"), which is configured to group the picked goods according to respective delivery batches. The third area (also called a "goods-packing area"), is configured to pack picked goods for delivery according to the delivery batches. For ease of description, the following description is given with the first, second, and third areas being goods-picking, goods-grouping and goods-packing areas, respectively, as an example.

Figure 1:
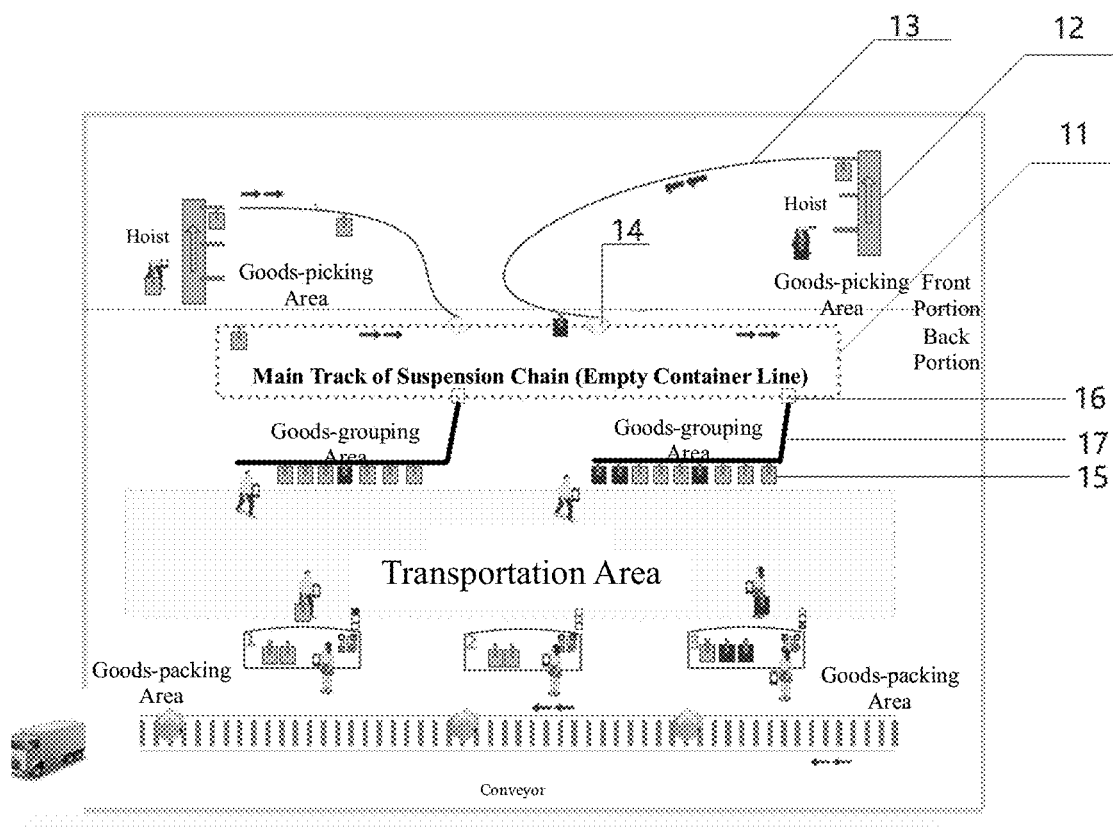
FIG. 1 schematically illustrates a store system provided in an embodiment of this application.

In some embodiments, in order to achieve a higher goods-picking and delivery efficiency, an operating area of an offline physical store as shown in FIG. 1 may be divided into a goods-picking area, a goods-packing area, and a goods-grouping area between the above two. The goods-picking area is usually further divided into a plurality of sub-areas each storing goods of a certain category and arranged with one or more goods-picking persons for fulfilling goods-picking tasks. In some embodiments, the goods-packing area may be further divided into a plurality of sub-areas arranged with goods-packing persons for performing packing operations for multiple orders or batches in parallel (specifically, in each of the sub-areas, a packing operation for only a single batch may be performed at a time). The goods-grouping area between the goods-picking and goods-packing areas may also include one or more sub-areas and is configured to receive goods picked from the goods-picking area. Goods-grouping persons may be arranged in the goods-grouping area to perform grouping operations on the picked goods. That is, the picked goods belonging to individual delivery batches are sent to respective good-packing sub-areas for packing.

In some embodiments, the goods-picking area is usually located in a front portion of the store, with the goods-grouping and goods-packing areas being both located in a back portion thereof that is possibly rather distant from the front portion. Therefore, manual transportation of picked goods to the goods-grouping area would be costly in both labor and time. For this reason, an automatic transfer device may be deployed between the goods-picking and goods-grouping areas to replace manual transportation. Such a transfer device may be implemented in various manners, for example, as a conveyor. Alternatively, in order to save space in the store and avoid adversely affecting operations in the manual work areas, the transfer device may be implemented as a suspension chain 11 as shown in FIG. 1. In a particular implementation, the suspension chain may be called a suspended conveying chain which may employ ball bearings as wheels of the chain to allowing an arbitrary turn and climbing, leading to a strong adaptive capacity thereof to any geographical condition. Further, a plurality of hooks may be configured along the suspension chain, and thus the goods-picking containers may be hung on the hooks and transported by the suspension chain. For example, the suspension chain track may be arranged on a ceiling, or somewhere else, of the store, while at a height inaccessible to goods-picking persons. Thus, it is necessary to consider how the goods-picking persons can hang the goods-picking containers on the suspension chain. This may be accomplished in many ways. For example, in one implementation, the suspension chain may include sub-tracks arranged at good-picking area and extending to the main track of the suspension chain. Each sub-track has one end accessible to goods-picking persons and a further end connecting the main track. In this design, a goods-picking person may hang a goods-picking container loaded with picked goods on the sub-track, which transports the container onto the main track. The container is then transported to the goods-grouping area.

In some embodiments, in the goods-picking area, hoists 12 and conveyor lines 13 connecting the hoists 12 to the suspension chain may be arranged, with loading adapters 14 being disposed at the ends of the conveyor lines connecting the suspension chain. In this design, picked goods may be placed into a goods-picking container 15, which is then lifted to a certain height by one of the hoists 12 and hung and transferred to the hooks of the suspension chain through the leading adapters. After being hung on a hook on the suspension chain through the loading adapter, the container is transported by the suspension chain to the goods-grouping area. Each of the goods-picking sub-areas may be provided with such a hoist for loading picked goods onto the suspension chain for transportation. As shown in FIG. 1, the suspension chain may be ring-shaped and run continuously toward a direction (clockwise or counterclockwise) so that, in each goods-picking sub-area, upon the completion of a goods-picking task, the picked goods may be raised by the hoist and transported by the suspension chain at any desired time. The suspension chain may be further provided on the side close to the goods-grouping area with unloading adapters 16 each connected to a gliding device 17. In this arrangement, when a goods-picking container reaches one of the unloading adapters, it may glide down along the glide device connected to the adapter and then join a queue of goods-picking containers in the goods-grouping area, where the goods-picking containers corresponding to a same delivery batch is identified and sent to one of the goods-packing sub-areas for packing.

As may be seen from the above description, the automatic transfer system arranged between the goods-picking and goods-grouping areas may lead to cost savings in labor required for transportation from the goods-picking area to the goods-grouping area. In some embodiments, such an automatic transfer system is considered unnecessary between the goods-grouping and goods-packing areas because they are relatively close to each other so that manual transportation is not a concern, in particular, when the offline physical store is small in scale. On the other hand, for goods-picking containers that have arrived at the goods-grouping area, it is necessary to consider how goods-grouping persons there identifies information of the goods-picking containers, how they know which delivery batches the goods-picking containers belong to, how they determine which ones of the goods-picking containers belong to a certain delivery batch, how they ensure that goods-picking containers belonging to the same delivery batch are sent to the same goods-packing sub-area, and how they avoid the arrival of a new batch of goods-picking containers at the same goods-packing sub-area before packing of the current batch is completed, and so forth.

In one implementation, the goods-picking persons may provide, by hand-writing, printing or otherwise, on each goods-picking container, its information including a delivery batch ID, a goods-picking task ID, etc. The goods-grouping persons may identify individual goods-picking containers and group them according to batches by reading information thereon. After that, it may be determined whether there is any idle goods-packing sub-area by human-to-human communication or otherwise. Of course, this approach is inefficient and costly in both labor and time, because it requires printing or handwriting of information such as batch IDs and goods-picking task IDs by goods-picking persons, identification and grouping of goods-picking containers by goods-grouping persons through visual checking or otherwise, and repeated communication with goods-packing persons in the goods-packing area.

Figure 2:
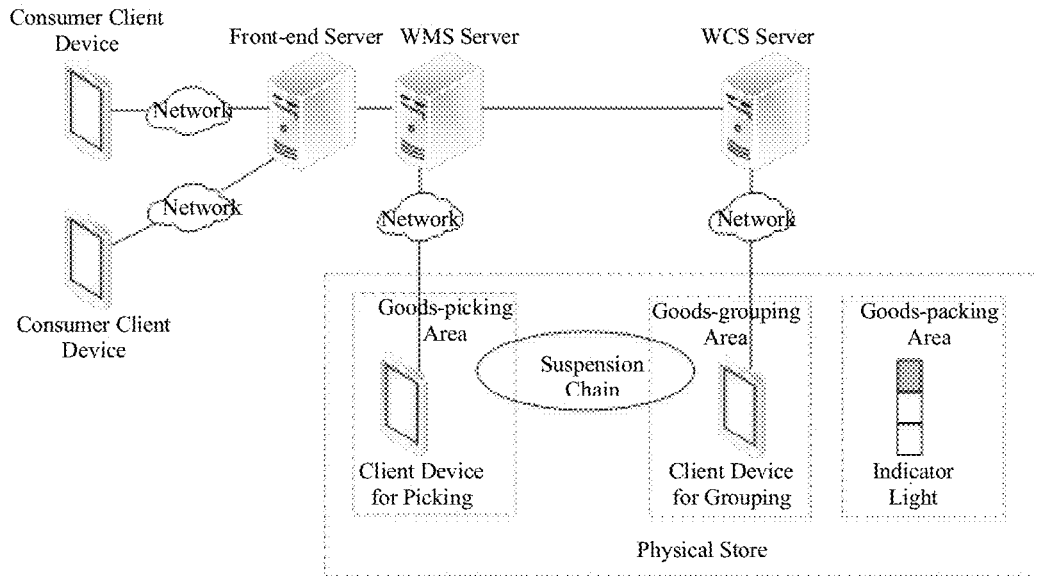
FIG. 2 is a schematic illustration of an information processing system provided in an embodiment of this application.

In some embodiments, a warehouse control system (WCS) and associated first terminal devices may be implemented. As shown in FIG. 2, the warehouse control system may include a first server (also referred to as a "WCS server") and client devices. The first server may be deployed in a cloud, or directly in the store, and configured mainly for maintenance of status information of the various goods-packing sub-areas, allocation of goods-picking containers for goods-packing sub-areas, and so on. Each of the first terminal devices is configured for use essentially by a goods-grouping personnel and may be configured with scanning capabilities and a display screen for displaying information such as an identifier of a goods-packing sub-area allocated by the server. In some embodiments, such a first terminal device may be implemented as a mobile terminal device such as a mobile phone, and a WCS client application may be installed in the first terminal device in advance. The client application may utilize related hardware components in the first terminal device to perform code scanning operations and exchange information with a server of an information control system in order to provide the goods-grouping person with information for reference.

In some embodiments, each goods-picking container may be provided with a graphical code that carries a unique identifier (ID) of the goods-picking container. As a result, the first terminal device may scan the graphical code on any goods-picking container transferred to the second area and submit the ID of the goods-picking container obtained from the scan to the first server. The first server may be configured to (1) obtain a correlation among an identifier of the goods-picking container, an identifier of a delivery batch, and an identifier of a goods-picking task, (2) determine, based on the identifiers of the goods-picking containers submitted by the first terminal device, the identifier of the goods-picking task corresponding to each goods-picking container and the delivery batch to which the task belongs, and (3) generate notification information based on the delivery batch. The first terminal device may further configured to display the notification information based on which the goods-grouping person may transport the goods-picking container to the third area.

In some embodiments, the first server may obtain the correlations between goods-picking container IDs and delivery batch IDs and goods-picking task IDs in many ways. For example, in one of such implementations, a warehouse management system (WMS) may be provided. The WMS may include a second server (also referred to as a "WMS server" or the like) and second client devices. Similarly, the second server may also be deployed in a cloud, and a second client application may be installed in second terminal devices for use by picking persons in the goods-picking area. A graphical code may be in advance printed, adhered to an adhesive substrate on, or otherwise provided on each goods-picking container, which contains a unique identifier (ID) of the goods-picking container. In one particular implementation, online orders submitted to a front-end server from front-end consumer client devices may be transmitted to the WMS, which may then group them according to delivery batches based on delivery addresses, times and the like associated with the orders. That is to say, a single delivery batch may include one or more orders. For each delivery batch, the WMS may generate identification information for the batch itself and, depending on information such as type(s) of goods included therein, generate goods-picking task(s) each with a goods-picking task ID. Each goods-picking task may be then allocated for the second client application running on a terminal device in a corresponding one of the goods-picking sub-areas. During a process of picking a goods-picking container, a goods-picking container may be picked first, then a second terminal device scans the graphical code on the container, and the picked goods are put into the goods-picking container and transferred by the suspension chain. At the same time, the scanning result containing the received identifier of goods-picking task and the associated identifier of the delivery batch may be transmitted back to the WMS server by the second terminal device, and then the WMS server is able to establish a correlation of the goods-picking container's ID with the batch and task IDs. In other words, with allocated tasks being successively performed, the WMS may maintain a plurality of such correlations, for example, as shown in Table 1:

TABLE 1

| No. | Batch ID | Goods-picking Task ID | Goods-picking Container ID |
|---|---|---|---|
| 1 | 100001 | 200001 | 300001 |
| 2 | 100001 | 200002 | 300002 |
| ... | ... | ... | ... |

This correlation information may be synchronized with (transferred to) the WCS server so that the WCS server also maintains the same correlation information. In this way, when the goods-picking container is transferred to the goods-grouping area, it may be scanned by a goods-grouping person there using a terminal device, and the scanned information will be transmitted to the WCS server, which may then determine batch ID and goods-picking task ID associated with the goods-picking container, based on the information as shown in Table 1. After that, operations may be performed to, for example, allocate for a goods-packing sub-area and provide the goods-grouping person with notification information.

During the allocation for the goods-packing sub-area, it may be first determined whether the goods-picking container is the first goods-picking container in the batch that arrives at the goods-grouping area. If it is, the goods-picking container may be allocated for a sub-area for packing based on the status of each sub-area. Specifically, if there are idle goods-packing sub-areas, then one of them may be allocated to the batch, and identification information of the allocated goods-packing sub-area may be sent back to the terminal device used by the goods-grouping person. In this way, the goods-grouping person may transport the goods-picking container to the allocated goods-packing sub-area. If there is currently no idle goods-packing sub-area, a notification about waiting is issued and the goods-picking container's ID is added into a waiting queue. When any of the goods-packing sub-areas become idle, it may be allocated to the first goods-picking container in the queue, as well as to any other goods-picking container therein that belongs to the same batch as the first goods-picking container, followed by a generation of notification information, which is then sent to the terminal device of the goods-grouping person. If it is determined that the goods-picking container is not the first goods-picking container in the batch that arrives at the goods-grouping area, it may be further determined whether the goods-picking container has been allocated for a goods-packing sub-area. If it has, an identifier of the goods-packing sub-area that has been allocated with the delivery batch may be directly transmitted back to the terminal device of the goods-grouping person. If the goods-picking container has not been allocated for any goods-packing sub-area, it may be added to the waiting queue along with any other goods-picking container belonging to the same delivery batch.

Based on the above, the batch of the goods-picking containers is determined no longer by manual work of the goods-grouping persons but by a WCS server in an automatic manner. The only operations that need to be performed by goods-grouping persons are to scan graphical codes and to transport goods-picking containers to goods-packing sub-areas as instructed and specified. Thus, an improvement in efficiency may be obtained.

Further, delivery batches may vary from one another in the number of goods-picking tasks and thus in the number of required goods-picking containers. Therefore, goods-packing of any delivery batch will not start until all the goods-picking containers corresponding to all the tasks of the delivery batch have been available. In order for the goods-packing persons to easily know whether all the goods-picking containers belonging to the same delivery batch have arrived, one or more indicator lights may be provided in each of the goods-packing sub-areas. A control system of each indicator light may be connected to the WCS server. Since this server maintains information about the arrival of the goods-picking containers corresponding to each delivery batch, when finding all the goods-picking containers of a certain delivery batch have been transferred to the goods-grouping area and allocated for one of the goods-packing sub-areas, the indicator light in this goods-packing sub-area may be activated. In this way, the goods-packing person there may know when to start a packing operation according to the status of the indicator light. Additionally, as there may be goods that need to be packed as soon as possible, such as those having been heated or requiring refrigeration, each goods-packing sub-area may be provided with indicator lights with different colors. In this case, the WCS may activate lights with corresponding colors depending on types of goods to be packed, for example, green for ordinary goods without special requirements in packing time, and red for goods with special requirements in packing time. Furthermore, upon the completion of a packing operation in a goods-packing sub-area, the goods-packing person may inform the WCS of the completion by turning off the indicator light so that the WCS may idle the goods-packing sub-area and make it available for goods-picking containers in the next delivery batch.

The subject matter of embodiments of this application will be better understood from the following description of an overall process involving all the above-discussed processing areas according to a practical example. Specifically, the process may include: receiving and grouping orders and generating a plurality of delivery batches with respective batch IDs, by the WMS; for each of the delivery batches, generating a plurality of goods-picking tasks with respective goods-picking task IDs; dispensing the goods-picking tasks to the client devices in the corresponding goods-picking areas; picking goods according to the received goods-picking tasks in the goods-picking area, placing the goods into goods-picking containers, scanning visual codes on the goods-picking containers, submitting the scanned information containing the batch IDs and goods-picking task IDs to the WMS, and loading the goods-picking containers onto the suspension chain via the hoists, and the suspension chain then transports them to the goods-grouping area; recording, by the WMS, correlations of identifiers of the goods-picking containers with the batch IDs and goods-picking task IDs; transmitting, by the WMS, the correlations to the WCS server, which then stores the correlations; upon arrival of the goods-picking containers at the goods-grouping area, scanning the graphical codes on the goods-picking containers by the client devices in the goods-grouping area and transmitting the scanning results to the WCS server; allocating, by the WCS server, goods-packing sub-areas with the goods-picking containers and transmitting the allocation results back to goods-grouping persons, wherein the allocation is accomplished in accordance with the following criteria: (i) all goods-picking containers corresponding to the goods-picking tasks of a single delivery batch are allocated for a single goods-packing sub-area; and (ii) in a single goods-packing sub-area, only goods-picking container(s) belonging to a single batch is/are present at a single time; displaying, by client devices of the goods-grouping persons, a notification information about the allocation results of the goods-packing sub-areas to the goods-grouping persons so that they may transport the goods-picking containers to the corresponding goods-packing sub-areas as instructed by the notification information; optionally monitoring, by the WCS server, the arrival of the goods-picking containers corresponding to the same delivery batch at the allocated goods-packing sub-areas, and when determining all the goods-picking containers corresponding to any of the delivery batches have arrived at the allocated goods-packing sub-area, activating the indicator light in the goods-packing sub-area, wherein the activated indicator light may be activated with colors corresponding to a packing time requirements of goods in the delivery batch; upon the completion of packing of any delivery batch in a goods-packing sub-area, providing the delivery batch to a delivery person for delivery and, optionally, informing, by the goods-packing person, the WCS server of the completion through turning off the indicator light; and idling, by the WCS, the goods-packing sub-area so that it waits for being allocated with goods-picking containers in the next delivery batch.

In summary, according to an embodiment of this application, the space in a store may be divided into first, second, and third areas, and after delivery batches and goods-picking tasks are generated according to incoming orders, they may be dispensed to the first area and thus goods may be picked up and placed into goods-picking containers in the first area. The goods-picking containers containing goods are then transferred by the automatic transfer device arranged between the first and second areas to the second area, where the goods-picking containers are transferred to the third area according to the delivery batches in a batch by batch manner. After being packed in the third area based on the delivery batches, the goods are prepared for delivery. In this way, the conventional layout of the first area as a front portion of the store is allowed to be unchanged. For example, as conventionally practiced, the first area may be divided, according to types of goods stored therein, into a plurality of sub-areas each configured for fulfilling of one or some goods-picking tasks for each delivery batch. For this reason, goods-picking operations may be simplified in each sub-area and performed in parallel across individual sub-areas. In addition, the use of the automatic transfer device may lead to savings in labor and time for transporting picked goods from the front portion to a back portion of the store. Further, the second area allows goods-picking containers to be grouped according to delivery batches before they are sent to the third area for packing. This enables packing operations in the third area to be performed according to individual delivery batches, resulting in a further improvement in processing efficiency.

Furthermore, in optional embodiments, a warehouse control system and associated terminal devices may be provided, which may improve operating efficiency in the goods-grouping area.

Embodiment 2

Figure 3:
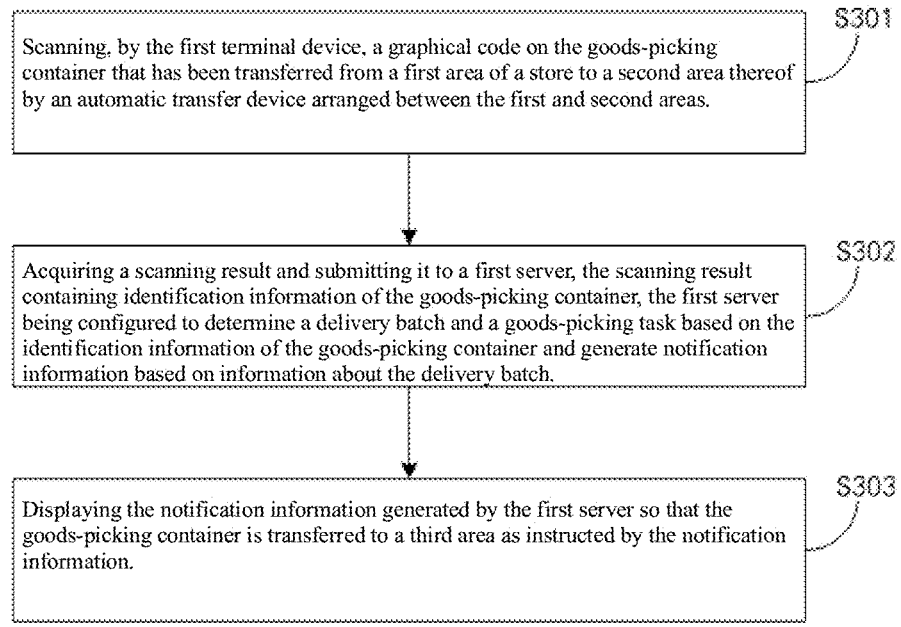
FIG. 3 is a flowchart of a first method provided in an embodiment of this application.

In Embodiment 2, which corresponds to Embodiment 1, a method for processing information for a goods-picking container is provided, which is described based on the use of a first terminal device. As shown in FIG. 3, the method includes: (S301) scanning, by the first terminal device, a graphical code on the goods-picking container that has been transferred from a first area of a store to a second area thereof by an automatic transfer device arranged between the first and second areas; (S302) acquiring a scanning result and submitting it to a first server, the scanning result containing identification information of the goods-picking container, the first server being configured to determine a delivery batch and a goods-picking task based on the identification information of the goods-picking container and generate notification information based on information about the delivery batch; and (S303) displaying the notification information generated by the first server so that the goods-picking container is transferred to a third area as instructed by the notification information.

Embodiment 3

Figure 4:
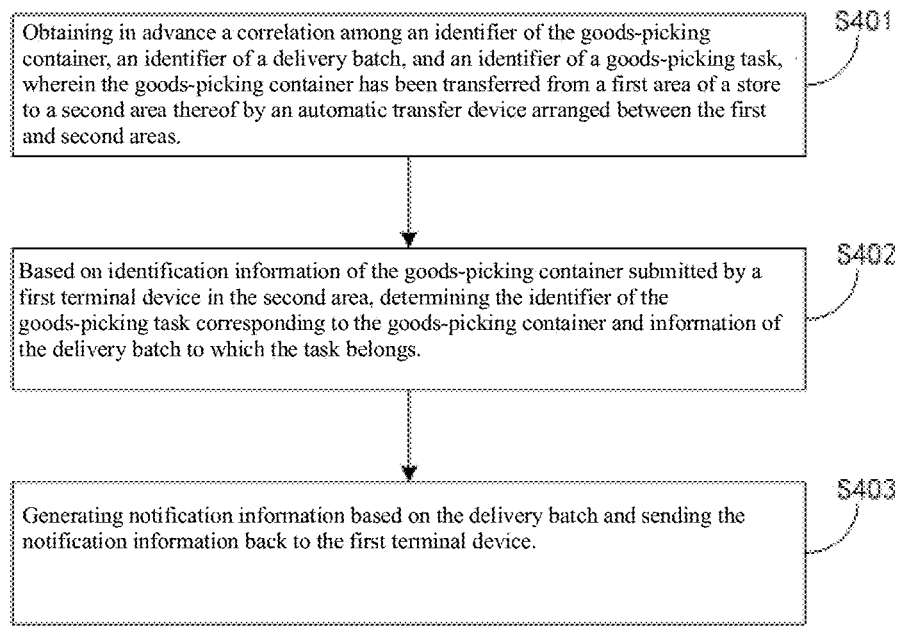
FIG. 4 is a flowchart of a second method provided in an embodiment of this application.

In Embodiment 3, which also corresponds to Embodiment 1, a method for processing information for a goods-picking container is provided, which is described based on the use of a first server. As shown in FIG. 4, the method includes: (S401) obtaining in advance a correlation of an identifier of the goods-picking container with an identifier of a delivery batch and an identifier of a goods-picking task, wherein the goods-picking container has been transferred from a first area of a store to a second area thereof by an automatic transfer device arranged between the first and second areas; (S402) based on identification information of the goods-picking container submitted by a first terminal device in the second area, determining the identifier of the goods-picking task corresponding to the goods-picking container and information of the delivery batch to which the task belongs; and (S403) generating notification information based on the delivery batch and sending the notification information back to the first terminal device.

In one particular implementation, operating status information of a third area of the store may be obtained, which indicates whether the third area is occupied or idle. Goods contained in goods-picking containers are packed in the third area according to each delivery batch. Additionally, the notification information may be generated based on both the delivery batch and the operating status information of the third area.

During the generation of the notification information, it may be first determined whether a current goods-picking container is the first one of goods-picking containers in the delivery batch to arrive at the second area. If it is, the third area may be allocated with the delivery batch based on the operating status of the third area, and the notification information may be generated based on information about the allocated third area.

Specifically, if the current goods-picking container is the first one of the goods-picking containers in the delivery batch to arrive at the second area and the third area is idle, then the idle third area may be allocated with the delivery batch.

If the current goods-picking container is the first one of the goods-picking containers in the delivery batch to arrive at the second area but the third area is not idle, the identifier of the goods-picking container may be added to a waiting queue. Additionally, the goods-picking container is allocated for the third area according to a sequence of the queue after the third area becomes idle.

If the current goods-picking container is not the first one of the goods-picking containers in the delivery batch to arrive at the second area, it may be first determined whether the third area has been allocated with the delivery batch. If the determination is positive, then the notification information may be directly generated based on information indicating that the delivery batch has been allocated for the third area. If the third area has not yet been allocated with the delivery batch, the identifier of the goods-picking container may be added to a waiting queue. Additionally, the goods-picking container is allocated for the third area according to a sequence of the queue after the third area becomes idle, and the notification information is generated.

In addition, the first server may maintain information about the arrival of goods-picking containers corresponding to respective goods-picking tasks for the delivery batch. In the event of all the goods-picking containers in the delivery batch having arrived at the second area and been allocated for the third area, an indicator light in the third area may be activated.

The third area may be provided therein with a plurality of indicator lights having different colors associated with respective required effective packing times. In this case, according to the required effective packing time of a data object contained in the delivery batch, a corresponding one of the indicator lights having an associated one of the colors may be activated. Further, upon receiving a notice of turning off the indicator light, the third area may be idled so that it may be again allocated with a new delivery batch.

Reference may be made to the description of the first embodiment for details not given in the second and third embodiments, and any further description thereof will be omitted here.

Figure 5:
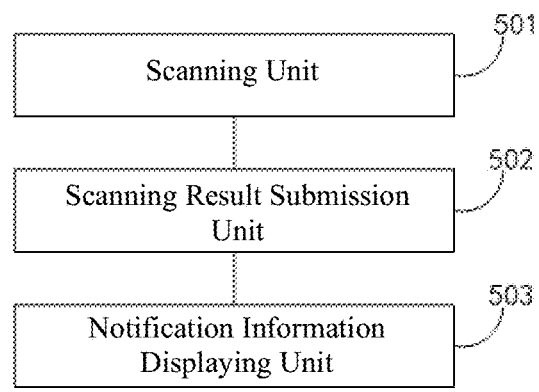
FIG. 5 is a schematic illustration of a first apparatus provided in an embodiment of this application.

In an embodiment of this application corresponding to Embodiment 2, an apparatus for processing information for a goods-picking container is further provided. Referring to FIG. 5, the apparatus may be implemented in the first terminal device and includes: a scanning unit 501 configured to scan a graphical code on the goods-picking container that has been transferred from a first area of a store to a second area thereof by an automatic transfer device arranged between the first and second areas; a scanning result submission unit 502 configured to obtain a scanning result and submit the scanning result to a first server, the scanning result containing identification information of the goods-picking container, the first server being configured to determine a delivery batch and a goods-picking task based on the identification information of the goods-picking container and generate notification information based on information about the delivery batch; and a notification information displaying unit 503 configured to display the notification information generated by the first server so that the goods-picking container is transferred to a third area as instructed by the notification information.

Figure 6:
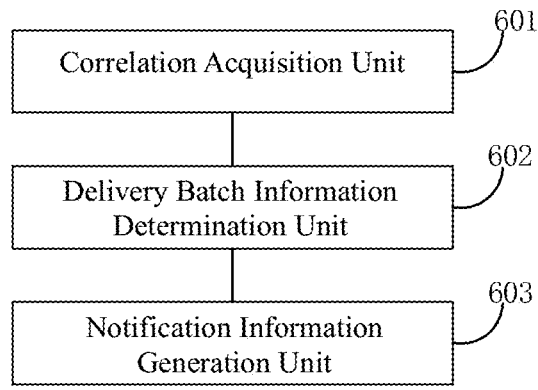
FIG. 6 is a schematic illustration of a second apparatus provided in an embodiment of this application.

In an embodiment of this application corresponding to Embodiment 3, an apparatus for processing information for a goods-picking container is provided. Referring to FIG. 6, the apparatus may be implemented in the first terminal device and includes: a correlation acquisition unit 601 configured to obtain in advance a correlation of an identifier of the goods-picking container with an identifier of a delivery batch and an identifier of a goods-picking task, wherein the goods-picking container has been transferred from a first area of a store to a second area thereof by an automatic transfer device arranged between the first and second areas; a delivery batch information determination unit 602 configured to determine, based on identification information of the goods-picking container submitted by a first terminal device in the second area, the identifier of the goods-picking task corresponding to the goods-picking container and information of the delivery batch to which the task belongs; and a notification information generation unit 603 configured to generate notification information based on the delivery batch and send the notification information back to the first terminal device.

In one particular implementation, the apparatus may further include: an operating status information acquisition unit configured to obtain operating status information of a third area of the store, the operating status information indicating whether the third area is occupied or idle, goods contained in goods-picking containers all belonging to the delivery batch are packed in the third area.

In some embodiments, the notification information generation unit may be configured to: generate the notification information based on both the delivery batch and the operating status information of the third area.

In some embodiments, the notification information generation unit may include: a first determination sub-unit configured to determine whether a current goods-picking container is the first one of goods-picking containers in the delivery batch to arrive at the second area; and a notification sub-unit configured to, if the determination is positive, allocate the third area with the delivery batch based on the operating status of the third area and generate the notification information based on information about the allocated third area.

In some embodiments, the notification sub-unit may be configured to: if the current goods-picking container is the first one of the goods-picking containers in the delivery batch to arrive at the second area and the third area is idle, allocate the idle third area with the delivery batch.

In some embodiments, the notification sub-unit may be configured to: if the current goods-picking container is the first one of the goods-picking containers in the delivery batch to arrive at the second area but the third area is not idle, add the identifier of the goods-picking container to a waiting queue; and allocate the goods-picking container for the third area according to a sequence of the queue after the third area becomes idle.

In some embodiments, the notification sub-unit may be configured to: if the current goods-picking container is not the first one of the goods-picking containers in the delivery batch to arrive at the second area, determine whether the third area has been allocated with the delivery batch; and if it has, generate the notification information based on information indicating that the delivery batch has been allocated for the third area.

In some embodiments, if the third area has not yet been allocated with the delivery batch, the identifier of the goods-picking container may be added to a waiting queue; allocate the goods-picking container for the third area according to a sequence of the queue after the third area becomes idle, and generate the notification information.

In some embodiments, the apparatus may further include: an arrival information maintenance unit configured to maintain information about arrival of goods-picking containers corresponding to respective goods-picking tasks for the delivery batch; and an indicator light control unit configured to, when all the goods-picking containers in the delivery batch having arrived at the second area and been allocated for the third area, activate an indicator light in the third area.

The third area may be provided therein with a plurality of indicator lights having different colors associated with respective required effective packing times.

In some embodiments, the indicator light control unit may be configured to: according to the required effective packing time of a data object contained in the delivery batch, activate a corresponding one of the indicator lights having an associated one of the colors.

In some embodiments, the apparatus may further include: a third area operating status switching unit configured to switch the third area to be idle upon receiving a notice of turning off the indicator light.

In a further embodiment of this application, a computer system is provided, the computer including: one or more processors; and a memory associated with the one or more processor, the memory being configured to store program instructions, which, when read and executed by the one or more processor, perform the operations of: obtaining in advance a correlation of an identifier of the goods-picking container with an identifier of a delivery batch and an identifier of a goods-picking task, wherein the goods-picking container has been transferred from a first area of a store to a second area thereof by an automatic transfer device arranged between the first and second areas; based on identification information of the goods-picking container submitted by a first terminal device in the second area, determining the identifier of the goods-picking task corresponding to the goods-picking container and information of the delivery batch to which the task belongs; and generating notification information based on the delivery batch and sending the notification information back to the first client terminal device.

Figure 7:
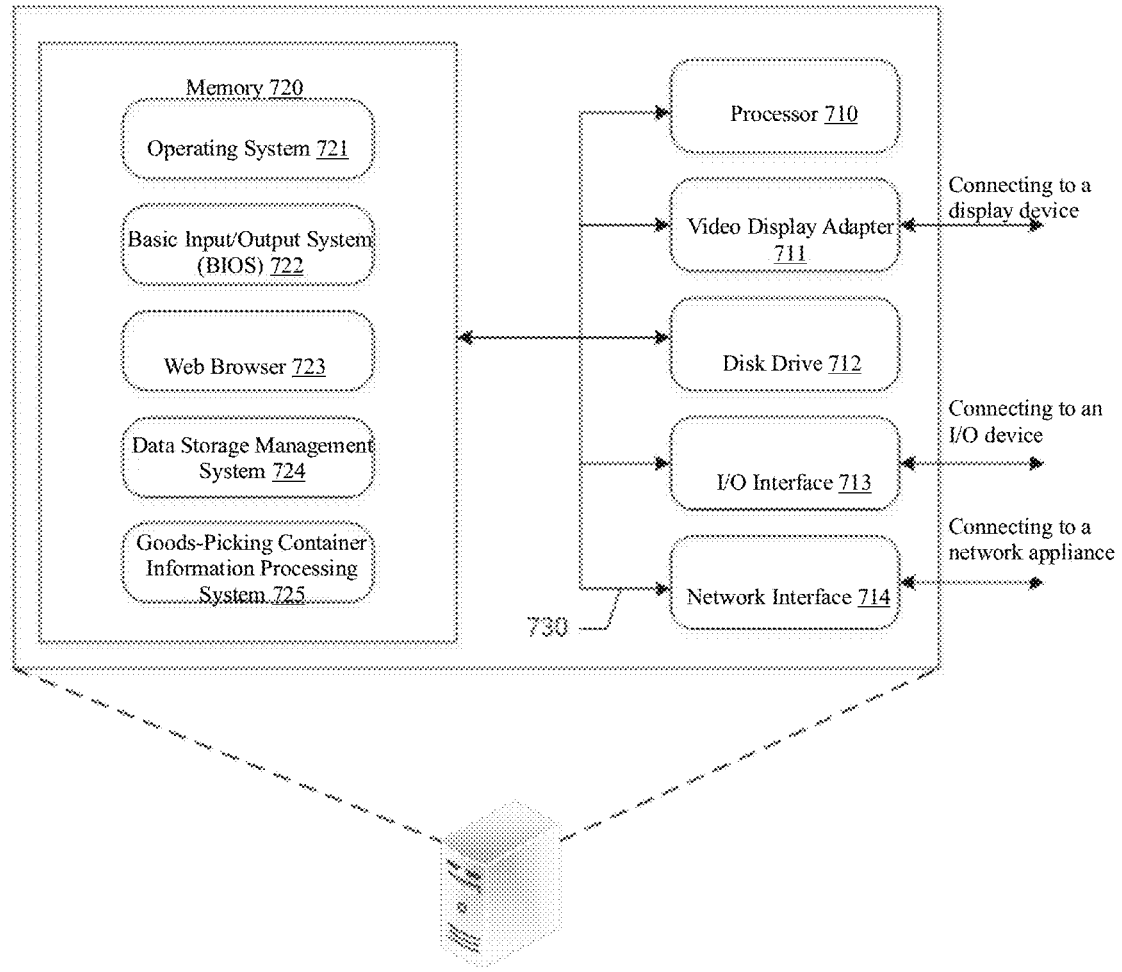
FIG. 7 is a schematic illustration of a computer system provided in an embodiment of this application.

FIG. 7 shows an exemplary architecture of the computer system. As shown, the computer system may include a processor 710, a video display adapter 711, a disk drive 712, an input/output (I/O) interface 713, a network interface 714 and the memory 720. The processor 710, the video display adapter 711, the disk drive 712, the I/O interface 713 and the network interface 714 may be communicatively connected to the memory 720 via a communication bus 730.

The processor 710 may be implemented as a general-purpose CPU (Central Processing Unit), a microprocessor, an application-specific integrated circuit (ASIC) or one or more integrated circuits and configured to execute related programs to implement the technical solutions of this application.

The memory 720 may be implemented as read-only memory (ROM), random access memory (RAM), a static memory device, a dynamic memory device, etc. The storage means 720 may store an operating system 721 for controlling operation of the computer system 700 and a basic input/output system (BIOS) 722 for controlling low-level operation of the computer system 700. It may also store a web browser 723, a data storage management system 724, a goods-picking container information processing system 725, etc. The system 725 may be the application programs for performing the above-described steps and operations according to embodiments of this application. In short, when the technical solutions of this application are implemented by software or firmware, related program codes are stored in the memory 720 and read and executed by the processor 710.

The I/O interface 713 may be connected to an I/O module and configured for information input and output. The I/O module may be implemented either as an internal component (not shown) or as an external device for providing the desired functions. Examples of an input device may include a keyboard, a mouse, a touch screen, a microphone and various sensors. Examples of an output device may include a display, a speaker, a vibrator and indicator lights.

The network interface 714 may be connected to a communication module (not shown) and configured for communicative interaction with other devices. The communication module may communicate either in a wired manner (e.g., through a USB, network cables, etc.) or in a wireless manner (i.e., via a mobile network, WiFi, Bluetooth, etc.).

The bus 730 may include paths for transmitting information between various components (e.g., the processor 710, video display adapter 711, disk drive 712, I/O interface 713, network interface 714 and memory 720).

Further, the computer system 700 may obtain specific reception condition information for condition determination from a virtual resource object reception condition information database 741.

It is to be noted that, while only the processor 710, the video display adapter 711, the disk drive 712, the I/O interface 713, the network interface 714, the memory 720 and the bus 730 have been shown and described above, in particular implementations, other components as required by normal operation may also be included. In addition, those skilled in the art will appreciate that it is also possible that only those necessary for implementing the solutions of this application, but not all the components shown, are included.

From the description of the above embodiments, it is apparent to those skilled in the art that the subject matter of this application may be implemented by a combination of software and a necessary generic hardware platform. With this in mind, the subject matter of this application is per se, or the part thereof advantageous over the prior art, may be embodied as a software product and the software product may be stored in a memory such as ROM/RAM, a magnetic disk or a CD-ROM and contain a number of instructions for causing a computing device (e.g., a personal computer, a server or a network appliance) to carry out the methods in the various embodiments of this application or part thereof.

The embodiments disclosed herein are described in a progressive manner, with the description of each embodiment focusing on its differences from others. Reference may be made between the embodiments for their identical or similar parts. In particular, since the systems and embodiments thereof are essentially similar to the respective method embodiments, they are described relatively briefly, and reference may be made to the description of the method embodiments for more details in them. The above-described systems and embodiments thereof are only illustrative, and modules that have been described as separate components herein may be physically separated or not and components that have been shown as modules may be physical modules or not. They may be deployed in a single location or distributed across a plurality of network devices. As actually needed, either all or some of such modules may be selected in accordance with embodiments disclosed herein. Those of ordinary skill in the art may understand and implement them without paying any creative effort.

Hereinabove, the methods and apparatuses for processing information for a goods-picking container, and the store system, provided in this application have been described in detail, and the principles and implementations of this application have been explained by way of specific examples. The above description is presented only for the purpose of facilitating an understanding of the methods of this application and the core concept thereof. For those of ordinary skill in the art, in light of the concept of this application, changes in specific implementations and the scope of application are possible. Accordingly, the present disclosure should not be construed as limiting this application in any sense.

The invention claimed is:

1. A store system, comprising:
a first area for storing goods and performing a plurality of goods-picking tasks, wherein each of the plurality of goods-picking tasks corresponds to one of one or more delivery batches and is performed with one of a plurality of goods-picking containers, and each of the one or more delivery batches comprises one or more goods-picking tasks;
an automatic transfer device arranged between the first area and a second area, and configured to automatically transfer each of the plurality of goods-picking containers containing goods picked according to a corresponding goods-picking task in the first area to the second area;
the second area for grouping the plurality of goods-picking containers into one or more groups corresponding to the one or more delivery batches, and for transferring the group of goods-picking containers corresponding to each delivery batch to a third area; and
the third area for packing the goods contained in the plurality of goods-picking containers according to each of the plurality of delivery batches, wherein the third area is configured with indicator lights;
wherein each of the plurality of goods-picking containers is configured with a graphical code containing a unique identifier of the goods-picking container, and
the store system further comprises a first terminal device configured to scan the respective graphical codes on the plurality of goods-picking containers transferred to the second area and submit the identifiers of the plurality of goods-picking containers obtained from the scan to a first server; and
the first server is configured to:
maintain information about arrival of the plurality of goods-picking containers corresponding to goods-picking tasks associated with each delivery batch, and to activate the indicator lights in the third area when all goods-picking containers belonging to the delivery batch have arrived at the second area and been allocated for the third area; and idle the third area upon receiving a notice of turning off the indicator lights.

2. The store system of claim 1, wherein the automatic transfer device comprises a suspension chain comprising a conveyor track arranged on a ceiling of the store and a plurality of hooks arranged along the conveyor track, and wherein the plurality of goods-picking containers are transferred by the plurality of hooks along the conveyor track to the second area.

3. The store system of claim 2, wherein the conveyor track is ring-shaped and continuously runs in a predetermined direction.

4. The store system of claim 2, wherein the first area is configured with hoists for lifting the plurality of goods-picking containers to a location of a predetermined height, and wherein conveyor lines are provided between the location of the predetermined height and the conveyor track of the suspension chain, and loading adapters are arranged at conjunctions between the conveyor lines and the conveyor track of the suspension chain, wherein the conveyor lines are configured to transfer and hang the goods-picking containers to the plurality of hooks of the suspension chain through the loading adapters.

5. The store system of claim 2, wherein the conveyor track of the suspension chain is configured with unloading adapters which are arranged close to the second area, and each of the unloading adapters is connected to a gliding device and configured to glide the goods-picking containers into a corresponding queue of goods-picking containers in the second area.

6. The store system of claim 1, wherein the first server is further configured to (1) obtain in advance correlations of the identifiers of the plurality of goods-picking containers with the one or more delivery batches and identifiers of the plurality of goods-picking tasks, (2) determine, based on the identifiers of the plurality of goods-picking containers submitted by the first terminal device, the identifier of the goods-picking task corresponding to each of the plurality of goods-picking containers and the delivery batch to which the goods-picking task belongs, and (3) generate notification information for the plurality of goods-picking containers based on allocation information of the delivery batches in the third area; and the first terminal device is further configured to display the notification information, based on which the plurality of goods-picking containers are transferred to the third area.

7. The store system of claim 1, wherein:

the first area is among a plurality of first areas for storing goods of different categories;

and the store system further comprises:

a second server configured to determine the one or more delivery batches based on received order information, generate the identifiers of the one or more delivery batches, generate a plurality of goods-picking tasks for each of the one or more delivery batches based on types of data objects contained in the delivery batch, assign an identifier to each of the plurality of goods-picking tasks, and distribute the plurality of goods-picking tasks to a plurality of second terminal devices in the plurality of first areas;

the second terminal devices configured to scan the plurality of goods-picking containers that contain the goods resulting from the plurality of goods-picking tasks and submit identifiers of the goods-picking containers obtained from the scan to the second server;

wherein the second server is further configured to establish correlations of the identifiers of the goods-picking containers with the identifiers of the delivery batches and the identifiers of the plurality of goods-picking tasks and transfer the correlations to the first server.

8. The store system of claim 1, wherein the indicator lights in the third area have a plurality of different colors associated with respective required effective packing times, and wherein the first server is further configured to activate, according to the required effective packing time for each of data objects contained in the delivery batch, the indicator lights with corresponding colors.

9. A method for processing information for goods-picking containers, comprising:

scanning, by a first terminal device, a graphical code on a goods-picking container that has been transferred from a first area of a store to a second area of the store by an automatic transfer device arranged between the first area and the second area, wherein the scanned graphical code comprises an identifier of the goods-picking container;

submitting, by the first terminal device, the identifier of the goods-picking container to a first server;

determining, by the first server, a corresponding goods-picking task based on the identifier of the goods-picking container, and a delivery batch to which the corresponding goods-picking task belongs, wherein the delivery batch comprises a plurality of goods-picking tasks respectively corresponding to a plurality of goods-picking containers;

generating, by the first server, notification information based on allocation information of the delivery batch in a third area, wherein the generating comprises:

determining whether the goods-picking container is a first one of the plurality of goods-picking containers of the delivery batch to arrive at the second area; and if so, allocating the delivery batch to the third area based on operating status of the third area and generating the notification information based on operating status of the third area after the allocation; and displaying, by the first terminal device, the notification information, based on which the goods-picking container is allocated to the third area.

10. The method of claim 9, further comprising:

obtaining, by the first server in advance, a correlation among the identifier of the goods-picking container, an identifier of the delivery batch, and an identifier of a goods-picking task.

11. The method of claim 9, further comprising:

obtaining the operating status of the third area of the store, the operating status comprises that the third area is occupied or idle, wherein goods contained in a plurality of goods-picking containers allocated to the third area are packed according to each delivery batch, wherein the generating the notification information comprises:

generating the notification information based on both the allocation information of the delivery batch to the third area and the operating status of the third area.

12. The method of claim 9, wherein allocating the delivery batch to the third area comprises:
if the goods-picking container is the first one of the plurality of goods-picking containers of the delivery batch to arrive at the second area and the third area is idle, allocating the delivery batch to the idle third area.

13. The method of claim 9, wherein allocating the delivery batch to the third area comprises:
if the goods-picking container is the first one of the plurality of goods-picking containers of the delivery batch to arrive at the second area but the third area is not idle, adding the identifier of the goods-picking container to a waiting queue; and
allocating the goods-picking container to the third area according to a sequence of the waiting queue after the third area becomes idle.

14. The method of claim 9, wherein generating the notification information further comprises:
if the goods-picking container is not the first one of the plurality of goods-picking containers of the delivery batch to arrive at the second area, determining whether the delivery batch has been allocated to the third area, and
if so, generating the notification information based on the allocation information of the delivery batch.

15. The method of claim 14, wherein generating the notification information further comprises:
if the delivery batch has not been allocated to the third area, adding the identifier of the goods-picking container to a waiting queue; and
allocating the goods-picking container for the third area according to a sequence of the queue after the third area becomes idle, and generating the notification information.

16. The method of claim 9, further comprising:
maintaining information about arrival of goods-picking containers corresponding to the goods-picking tasks for each of the delivery batches; and
when all the goods-picking containers in the delivery batch have arrived at the second area and been allocated to the third area, activating an indicator light in the third area.

17. The method of claim 16, wherein
the third area is configured with a plurality of indicator lights having different colors associated with respective required effective packing times, and wherein
activating the indicator light in the third area comprises:
according to the required effective packing time for a data object contained in the delivery batch, activating the plurality of indicator lights with corresponding colors.

18. A method for processing information for goods-picking containers, comprising:
scanning a graphical code on a goods-picking container that has been transferred from a first area of a store to a second area of the store by an automatic transfer device arranged between the first area and the second area, wherein the scanned graphical code comprises an identifier of the goods-picking container;
determining a corresponding goods-picking task based on the identifier of the goods-picking container, and a delivery batch to which the corresponding goods-picking task belongs, wherein the delivery batch comprises a plurality of goods-picking tasks respectively corresponding to a plurality of goods-picking containers;
generating notification information based on allocation information of the delivery batch in a third area, wherein the third area is configured with a plurality of indicator lights having different colors associated with respective required effective packing times;
displaying the notification information, based on which the goods-picking container is allocated to the third area;
maintaining information about arrival of goods-picking containers corresponding to goods-picking tasks for each of the delivery batches; and
when all the goods-picking containers in the delivery batch have arrived at the second area and been allocated to the third area, activating an indicator light in the third area, wherein the activating comprises:
according to the required effective packing time for a data object contained in the delivery batch, activating the plurality of indicator lights with the corresponding colors.

* * * * *